United States Patent
Sato et al.

(10) Patent No.: US 7,748,028 B2
(45) Date of Patent: Jun. 29, 2010

(54) AUTHENTICATION METHOD, TERMINAL DEVICE, RELAY DEVICE AND AUTHENTICATION SERVER

(75) Inventors: Atsushi Sato, Yokohama-shi (JP);
Katsuhiro Noguchi, Yokohama-shi (JP);
Hiroshi Aono, Yokohama-shi (JP);
Katsunobu Ohtsuki, Yokohama-shi (JP)

(73) Assignee: NTT DoCoMo, Inc., Tokyo (JP)

( * ) Notice: Subject to any disclaimer, the term of this patent is extended or adjusted under 35 U.S.C. 154(b) by 1360 days.

(21) Appl. No.: 11/167,345

(22) Filed: Jun. 28, 2005

(65) Prior Publication Data

US 2005/0289643 A1 Dec. 29, 2005

(30) Foreign Application Priority Data

Jun. 28, 2004 (JP) ............................. 2004-190442

(51) Int. Cl.
*G06F 21/00* (2006.01)
*G06F 15/16* (2006.01)
*H04L 9/32* (2006.01)

(52) U.S. Cl. .............................................. 726/5; 726/4
(58) Field of Classification Search ........................ None
See application file for complete search history.

(56) References Cited

U.S. PATENT DOCUMENTS

| 5,708,655 | A * | 1/1998 | Toth et al. .................... 370/313 |
| 6,311,275 | B1 * | 10/2001 | Jin et al. ........................ 726/12 |
| 6,643,782 | B1 * | 11/2003 | Jin et al. ......................... 726/3 |
| 6,779,118 | B1 * | 8/2004 | Ikudome et al. ................. 726/7 |
| 7,184,418 | B1 * | 2/2007 | Baba et al. ................... 370/331 |
| 7,359,989 | B2 * | 4/2008 | Orava et al. .................. 709/245 |
| 2003/0217285 | A1 | 11/2003 | Sanchez Herrero et al. |
| 2004/0153555 | A1 * | 8/2004 | Haverinen et al. .......... 709/229 |
| 2009/0144442 | A1 * | 6/2009 | Zheng et al. ................. 709/236 |
| 2009/0187646 | A1 * | 7/2009 | Hokkyo et al. .............. 709/221 |

FOREIGN PATENT DOCUMENTS

WO WO 2004/032415 A1 4/2004

OTHER PUBLICATIONS

3rd Generation Partnership Project; Technical Specification Group Services and System Aspects; 3GPP system to Wireless Local Area Network (WLAN) interworking System description (Release 6); 3GPP TS 23.234 V6.1.0, Jun. 2004.

(Continued)

*Primary Examiner*—Christopher A Revak
(74) *Attorney, Agent, or Firm*—Oblon, Spivak, McClelland, Maier & Neustadt, L.L.P.

(57) ABSTRACT

A terminal device in the present invention includes a first authentication information transmitter configured to transmit first authentication information including a user ID to a relay device, a temporary ID storage configured to store a temporary ID issued by an authentication server receiving the first authentication information via the relay device, and a second authentication information transmitter configured to transmit second authentication information including the temporary ID and an authentication server ID for identifying the authentication server to the relay device.

7 Claims, 14 Drawing Sheets

OTHER PUBLICATIONS

3rd Generation Partnership Project; Technical Specification Group Service and System Aspects; 3G Security; Wireless Local Area Network (WLAN) interworking security (Release 6); 3GPP TS 33.234 V6.1.0, Jun. 2004.

J. Arkko, et al., Extensible Authentication Protocol Method for UMTS Authentication and Key Agreement (EAP-AKA), Network Working Group, Internet-Draft, http://bgp.potaroo.net/ietf/all-ids/draft-arkko-pppext-eap-aka-12.txt, Apr. 5, 2004, 60 pages.

Paul Funk, et al., "EAP Tunneled TLS Authentication Protocol (EAP-TTLS)", PPPEXT Working Group, Internet-Draft, http://www.funk.com/documents/draft-ietf-pppext-eap-ttls-04.txt, Apr. 2004, 32 pages.

* cited by examiner

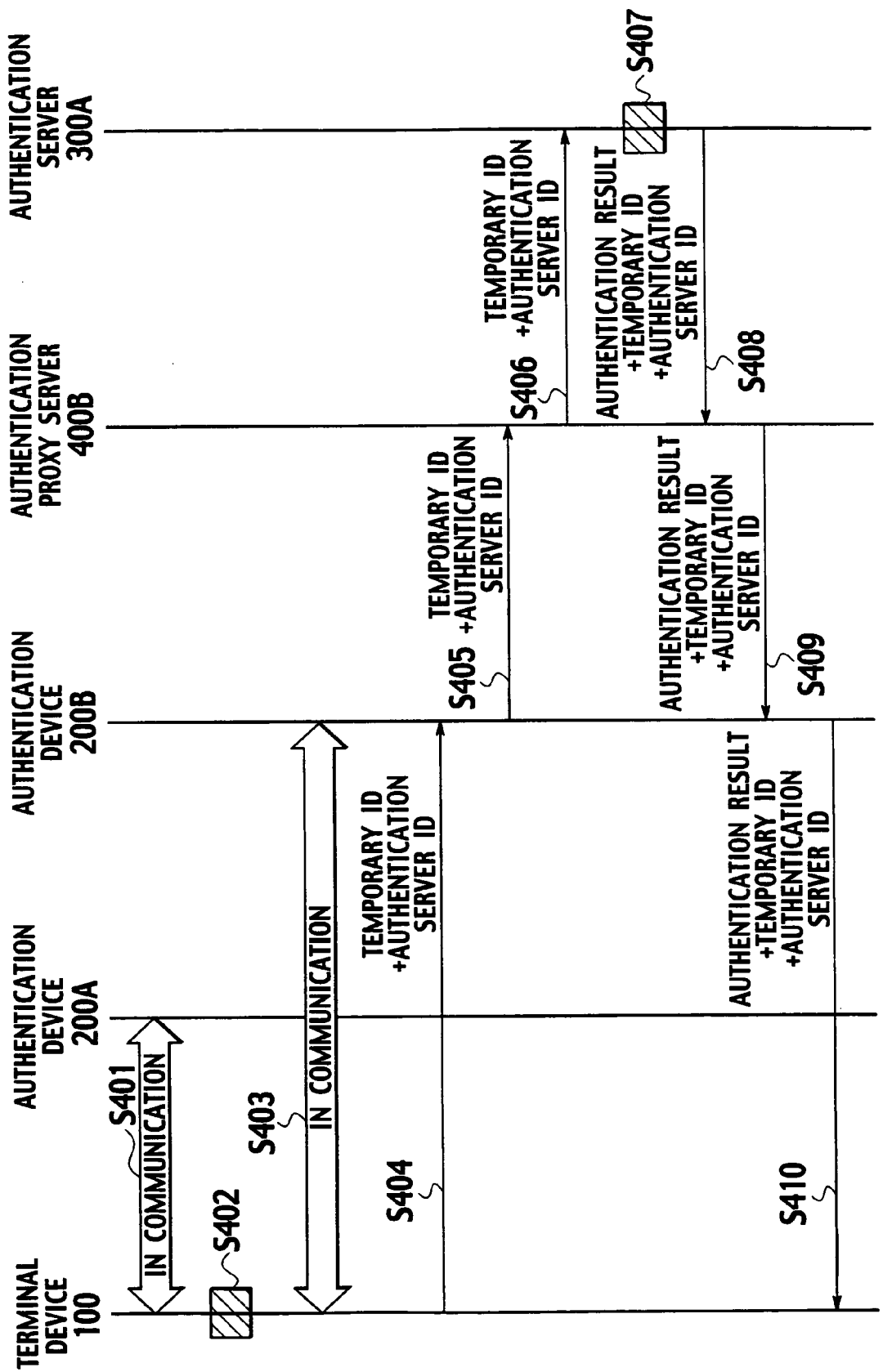

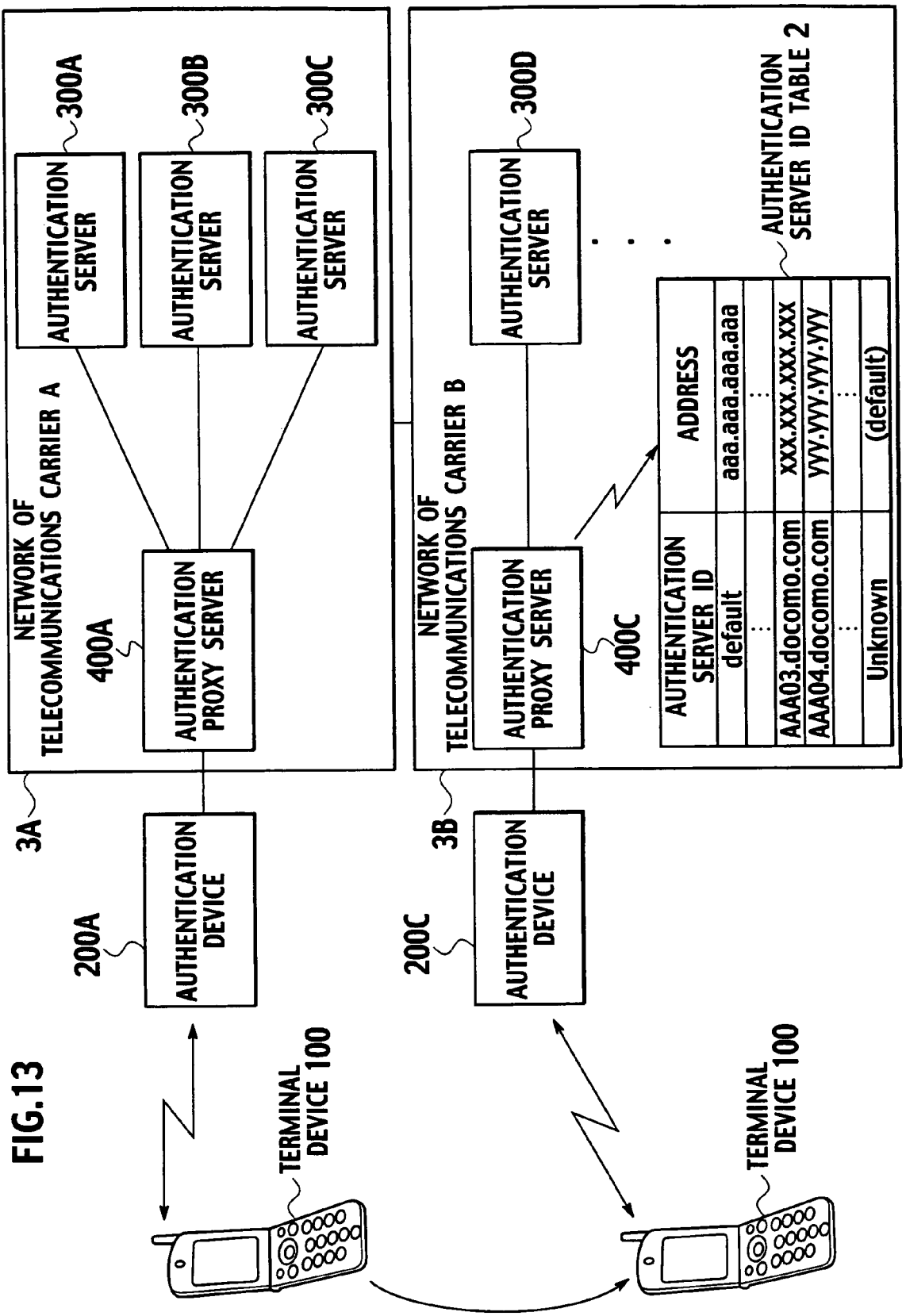

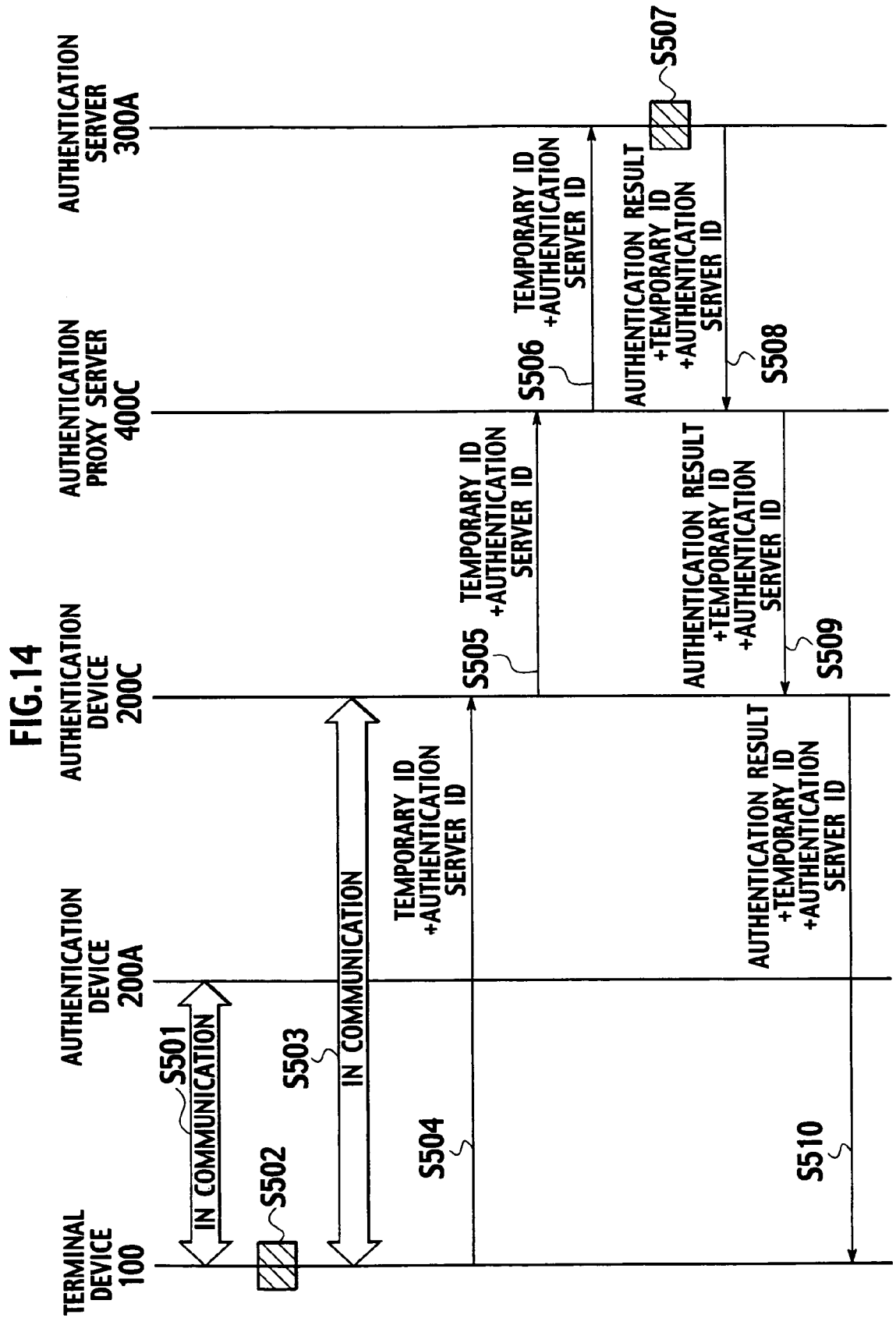

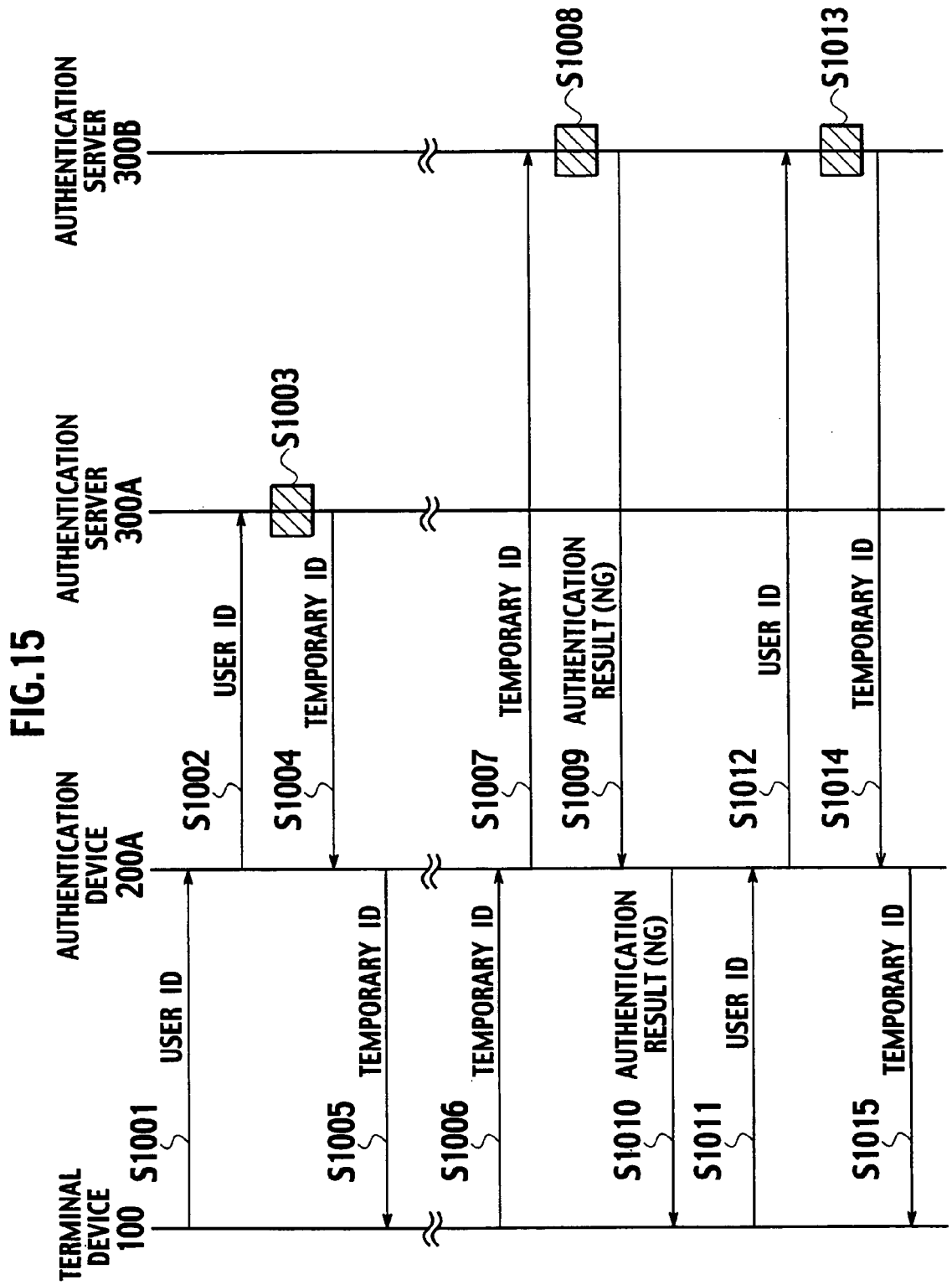

AUTHENTICATION METHOD, TERMINAL DEVICE, RELAY DEVICE AND AUTHENTICATION SERVER

CROSS REFERENCE TO RELATED APPLICATION

This application is based upon and claims the benefit of priority from the prior Japanese Patent Application No. P2004-190442, filed on Jun. 28, 2004; the entire contents of which are incorporated herein by reference.

BACKGROUND OF THE INVENTION

1. Field of the Invention

The present invention relates to an authentication method for performing user authentication processing on a user of a terminal device, and a terminal device, a relay device and an authentication server for use in the method.

2. Description of the Related Art

The EAP-TTLS method has been known as an authentication method for performing user authentication processing, concealing a user ID in a WLAN.

The EAP-TTLS method is so constructed that a secure tunnel is established between a terminal device and an authentication server, and the terminal device transmits a user ID to the authentication server through the established secure tunnel.

The EAP-TTLS method, however, has a problem that the step of establishing a secure tunnel is redundant.

In order to solve this problem, the EAP-AKA method has been devised as a method of performing user authentication processing without establishing a secure tunnel. With reference to FIG. 15, the EAP-AKA method will be briefly described.

As shown in FIG. 15, for initial user authentication processing, in step S1001, a terminal device 100 transmits authentication information including a user ID to an authentication device (relay device) 200A. In step S1002, the authentication device 200A forwards the authentication information to an authentication server 300A.

In step S1003, the authentication server 300A performs user authentication processing on a user of the terminal device 100, based on the authentication information received, and then generates a temporary ID (temporary user ID) for the user of the terminal device 100.

In step S1004, the authentication server 300A communicates the temporary ID to the authentication device 200A, and in step S1005, the authentication device 200A communicates the temporary ID to the terminal device 100.

Subsequent user authentication processing is performed in the authentication server 300A based on authentication information including the temporary ID transmitted from the terminal device 100.

User authentication processing using the conventional EAP-AKA method, however, has a problem that it does not work well when implemented by a plurality of authentication servers because each authentication server does not hold associations between user IDs and temporary IDs issued by the other authentication servers.

Referring to FIG. 15, this problem will be described in detail.

In step S1006, the terminal device 100 transmits authentication information including the temporary ID issued by the authentication server 300A to the authentication device 200A. In step S1007, the authentication device 200A forwards the authentication information to an authentication server 300B.

In this case, in step S1008, since the authentication server 300B does not hold the association between the temporary ID included in the received authentication information and the user ID, it cannot perform user authentication processing on the user of the terminal device 100 based on the authentication information.

Therefore, in step S1009, the authentication server 300B communicates an authentication result (NG) to the authentication device 200A accordingly. In step S1010, the authentication device 200A communicates the authentication result (NG) to the terminal device 100.

As a result, in steps S1011 to S1015, the terminal device 100 must perform another initial user authentication processing to obtain a temporary ID issued by the authentication server 300B.

If there are other authentication servers 300, the terminal device 100 needs to obtain a temporary ID issued by each authentication server 300 in order to selectively use a temporary ID with respect to an authentication server which is to perform user authentication processing.

BRIEF SUMMARY OF THE INVENTION

The present invention has been made in view of the above problems, and has an object of providing an authentication method capable of implementing safe user authentication processing, eliminating the need for a terminal device to obtain and selectively use a plurality of temporary IDs in a network where a plurality of authentication servers perform user authentication processing, and a terminal device, a relay device and an authentication server for use in the method.

According to a first aspect of the present invention, there is provided an authentication method for performing user authentication processing on a user of a terminal device, comprising the steps of transmitting, at the terminal device, first authentication information including a user ID to a relay device; forwarding, at the relay device, the first authentication information to an authentication server associated with the user ID; performing, at the authentication server, user authentication processing on the user of the terminal device, based on the first authentication information; issuing, at the authentication server, a temporary ID for the user of the terminal device and transmitting an authentication server ID for identifying the authentication server and the temporary ID to the relay device; communicating, at the relay device, the temporary ID and the authentication server ID to the terminal device; transmitting, at the terminal device, second authentication information including the temporary ID and the authentication server ID to the relay device; transmitting, at the relay device, third authentication information including the temporary ID to the authentication server, based on the authentication server ID included in the second authentication information; and performing, at the authentication server, user authentication processing on the user of the terminal device, based on the third authentication information.

According to a second aspect of the present invention, there is provided a terminal device configured to be used by a user on whom user authentication processing is performed by an authentication server, comprising a first authentication information transmitter configured to transmit first authentication information including a user ID to a relay device; a temporary ID storage configured to store a temporary ID issued by the authentication server receiving the first authentication information via the relay device; and a second authentication information transmitter configured to transmit second authentication information including the temporary ID and an authentication server ID for identifying the authentication server to the relay device.

According to a third aspect of the present invention, there is provided a relay device configured to forward authentication information transmitted from a terminal device to an authentication server, comprising a first authentication information transmitter configured to forward first authentication information including a user ID received from the terminal device to the authentication server associated with the user ID; and a third authentication information transmitter configured to transmit, when second authentication information including a temporary ID and an authentication server ID is received, third authentication information including the temporary ID to the authentication server identified by the authentication server ID.

According to a fourth aspect of the present invention, there is provided an authentication server configured to perform user authentication processing on a user of a terminal device, comprising a first authentication information processor configured to perform user authentication processing on the user of the terminal device, based on first authentication information including a user ID received from the terminal device; a temporary ID generator configured to generate a temporary ID for the user of the terminal device to communicate to the terminal device; and a third authentication information processor configured to perform user authentication processing on the user of the terminal device, based on third authentication information received, the third authentication information including the temporary ID transmitted from the terminal device.

BRIEF DESCRIPTION OF THE SEVERAL VIEWS OF THE DRAWINGS

FIG. 12 is a sequence diagram showing user authentication processing in the authentication system according to the fourth embodiment of the present invention;

FIG. 13 is an overall block diagram of an authentication system according to a fifth embodiment of the present invention;

FIG. 14 is a sequence diagram showing user authentication processing in the authentication system according to the fifth embodiment of the present invention; and FIG. 15 is a sequence diagram showing user authentication processing in an authentication system according to a related art.

DETAILED DESCRIPTION OF THE INVENTION

Authentication System in First Embodiment of the Invention

An authentication system according to a first embodiment of the present invention will be described with reference to FIGS. 1 to 5.

Figure 1:
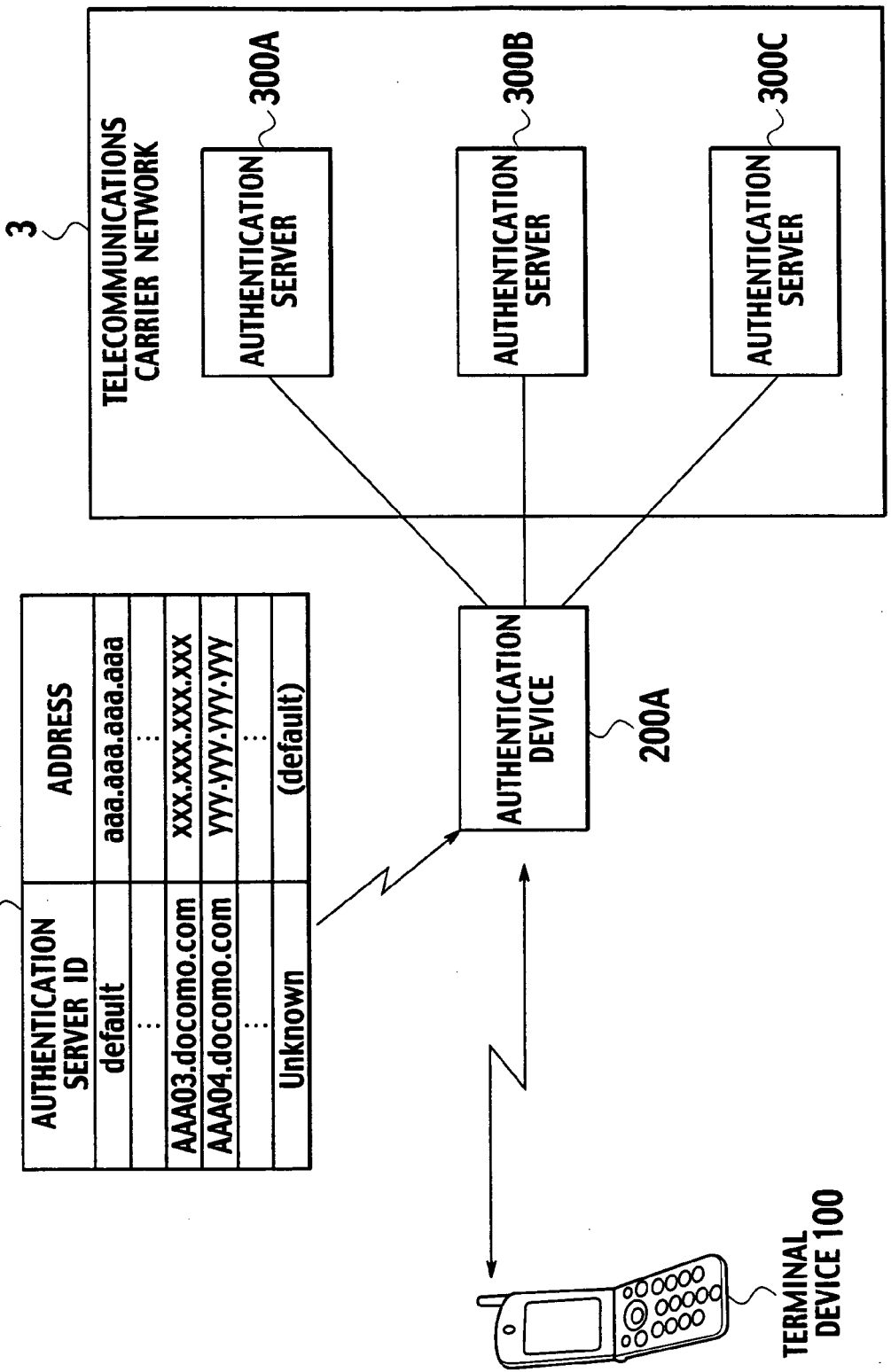
FIG. 1 is an overall block diagram of an authentication system according to a first embodiment of the present invention.

As shown in FIG. 1, the authentication system in this embodiment includes a terminal device 100, an authentication device 200A, and a telecommunications carrier network 3 constituted by a plurality of authentication servers 300A to 300C.

The authentication system of this embodiment is so constructed that one of the authentication servers 300A to 300C constituting the telecommunications carrier network 3 performs user authentication processing on a user of the terminal device 100.

In the authentication system of this embodiment, the terminal device 100 is configured to connect to the authentication device 200A via a wireless LAN, and the authentication device 200A is connected to all the authentication servers 300A to 300C in the telecommunications carrier network 3.

Figure 2:
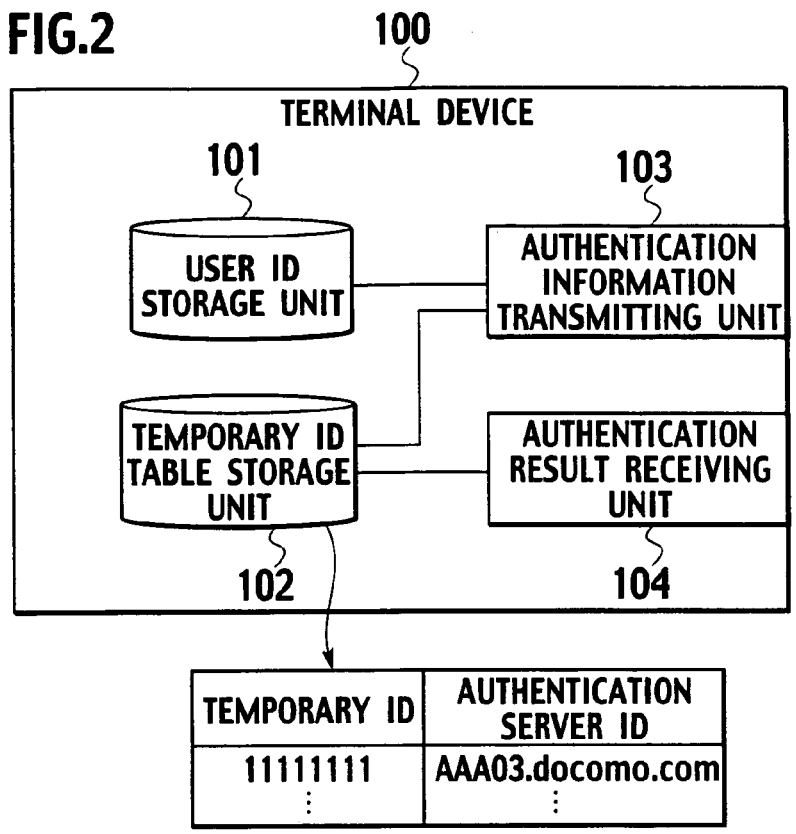
FIG. 2 is a functional block diagram of a terminal device in the authentication system according to the first embodiment of the present invention.

As shown in FIG. 2, the terminal device 100 is provided with a user ID storage unit 101, a temporary ID table storage unit 102, an authentication information transmitting unit 103, and an authentication result receiving unit 104. In this embodiment, a mobile communication terminal is used as the terminal device 100.

The user ID storage unit 101 is configured to store a user ID for identifying the user of the terminal device 100. For example, a mobile telephone number or the like can be used as the user ID.

The temporary ID table storage unit 102 is configured to store a temporary ID issued by an authentication server 300 receiving first authentication information (described below) via the authentication device 200A More specifically, the temporary ID table storage unit 102 is configured to store a temporary ID table in which a temporary ID is associated with an authentication server ID.

Here, the temporary ID is a temporary user ID issued by an authentication server performing initial user authentication processing on the user of the terminal device 100 in order to conceal the user ID.

The authentication server ID is identification information for identifying the authentication server issuing the temporary ID. For example, the URL or the like of the authentication server can be used as the authentication server ID.

The authentication information transmitting unit 103 is configured to transmit first authentication information including the user ID to the authentication device 200A for initial user authentication processing.

The authentication information transmitting unit 103 is also configured to transmit second authentication information including an appropriate temporary ID and authentication server ID to the authentication device 200A, referring to the temporary ID table storage unit 102, for subsequent user authentication processing.

Here, the subsequent user authentication processing includes periodical user authentication processing for key update, location registration and the like, and irregular user authentication processing for connection to services and calling, for example.

The authentication result receiving unit 104 is configured to receive an authentication result from an authentication server 300 via the authentication device 200A.

The authentication result receiving unit 104 may also be configured to update the temporary ID table in the temporary ID table storage unit 102, based on a temporary ID included in the received authentication result.

Figure 3:
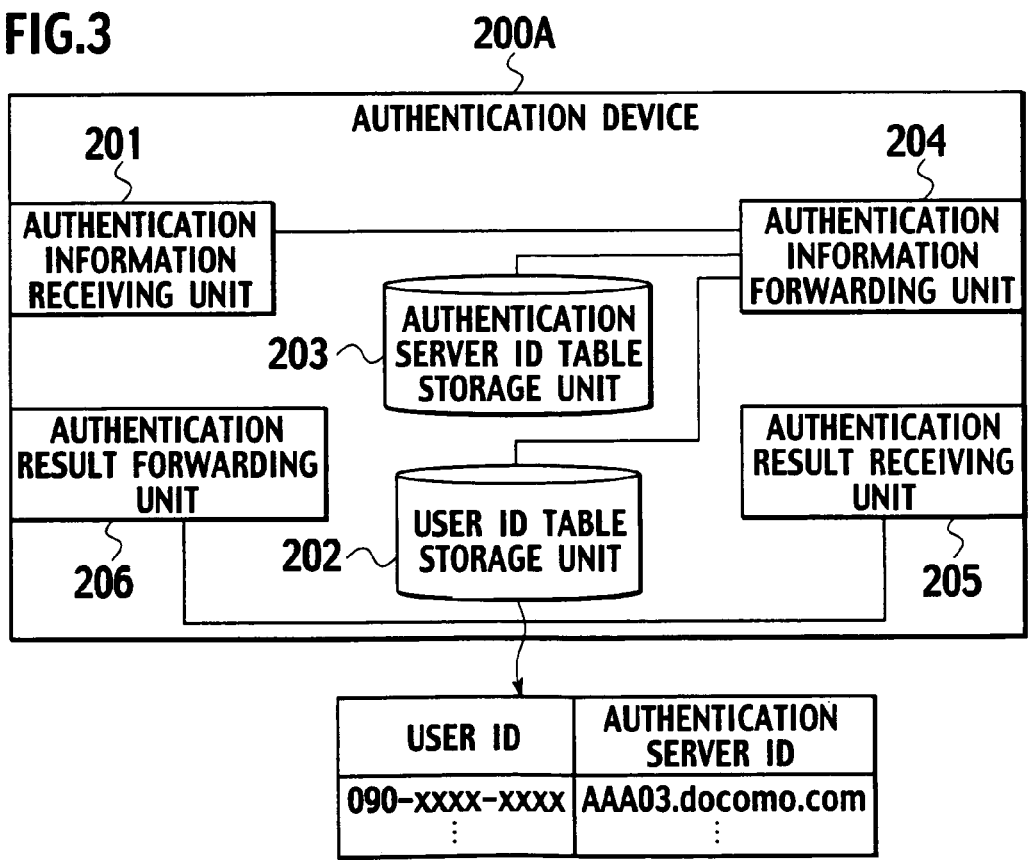
FIG. 3 is a functional block diagram of an authentication device in the authentication system according to the first embodiment of the present invention.

As shown in FIG. 3, the authentication device 200A is provided with an authentication information receiving unit 201, a user ID table storage unit 202, an authentication server ID table storage unit 203, an authentication information forwarding unit 204, an authentication result receiving unit 205 and an authentication result forwarding unit 206.

In this embodiment, the authentication device 200A is configured to serve as a relay device for forwarding authentication information transmitted from the terminal device 100 to one of the authentication servers 300A to 300C.

The authentication information receiving unit 201 is configured to receive first authentication information including the user ID or second authentication information including a temporary ID and an authentication server ID from the terminal device 100.

The user ID table storage unit 202 is configured to store a user ID table in which a user ID is associated with an authentication server ID.

Specifically, the user ID table storage unit 202 manages the authentication servers 300A to 300C to perform initial user authentication processing on users, using the user ID table.

The authentication server ID table storage unit 203 stores an authentication server ID table 2 as shown in FIG. 1, in which authentication server IDs are associated with addresses. An address shows the address of an authentication server, and shows the IP address of an authentication server, for example.

The address of an authentication server 300 identified by an authentication server ID which is not stored in the authentication server ID table 2 is set as the address of a "default" gateway ("aaa.aaa.aaa.aaa" in the example of FIG. 1).

The authentication information forwarding unit 204 is configured to forward first authentication information including the user ID received from the terminal device 100 to an authentication server 300 associated with the user ID.

More specifically, when receiving first authentication information including a user ID, the authentication information forwarding unit 204 refers to the user ID table and the authentication server ID table 2, and forwards the first authentication information to the address of an authentication server 300 associated with the user ID.

Also, when receiving second authentication information including a temporary ID and an authentication server ID, the authentication information forwarding unit 204 refers to the authentication server ID table 2, and transmits third authentication information including the temporary ID to an authentication server 300 identified by the authentication server ID.

More specifically, when receiving second authentication information including a temporary ID and an authentication server ID, the authentication information forwarding unit 204 may refer to the authentication server ID table 2, and directly forward the received second authentication information as third authentication information to an address associated with the authentication server ID, or may generate and forward new third authentication information including at least the temporary ID.

When the address of an authentication server 300 associated with a user ID included in received first authentication information, or an address associated with an authentication server ID included in received second authentication information cannot be found, the authentication information forwarding unit 204 may transmit the first authentication information or third authentication information to a default gateway.

The authentication result receiving unit 205 is configured to receive an authentication result showing the result of user authentication processing on the user of the terminal device 100, a newly generated temporary ID and an authentication server ID from an authentication server 300.

The authentication result forwarding unit 206 is configured to communicate an authentication result, a temporary ID and an authentication server ID received from an authentication server 300 to the terminal device 100.

Figure 4:
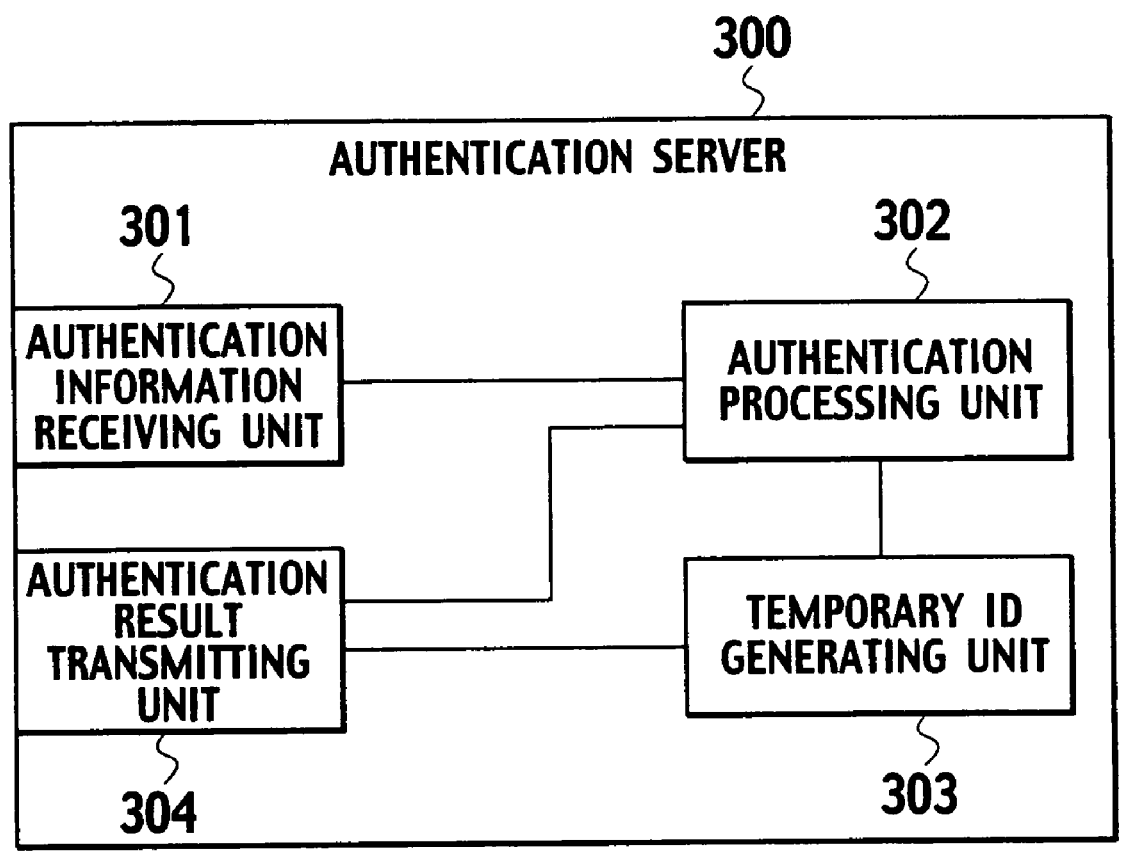
FIG. 4 is a functional block diagram of an authentication server in the authentication system according to the first embodiment of the present invention.

As shown in FIG. 4, each authentication server 300 is provided with an authentication information receiving unit 301, an authentication processing unit 302, a temporary ID generating unit 303 and an authentication result transmitting unit 304.

The authentication information receiving unit 301 is configured to receive first authentication information transmitted from a terminal device and third authentication information through the authentication device 200A.

The authentication processing unit 302 is configured to perform user authentication processing on the user of the terminal device 100, based on first authentication information or third authentication information received by the authentication information receiving unit 301.

More specifically, the authentication processing unit 302 is configured to verify whether or note a user identified by a user ID included in first authentication information is a normal user, and to verify whether or not a user identified by a temporary ID included in third authentication information is a normal user.

The temporary ID generating unit 303 is configured to generate a temporary ID for the user of the terminal device 100. Specifically, the temporary ID generating unit 303 randomly generates a temporary ID for the user of the terminal device 100 on completion of initial user authentication processing. The temporary ID generating unit 303 also randomly generates a new temporary ID for the user of the terminal device 100 on completion of subsequent user authentication processing.

The authentication result transmitting unit 304 is configured to communicate a temporary ID generated by the temporary ID generating unit 303 and an authentication server ID for identifying the authentication server 300, together with an authentication result showing the result of user authentication processing by the authentication processing unit 302, to the terminal device 100 via the authentication device 200A.

Next, user authentication processing in the authentication system according to this embodiment will be described with reference to FIG. 5.

Figure 5:
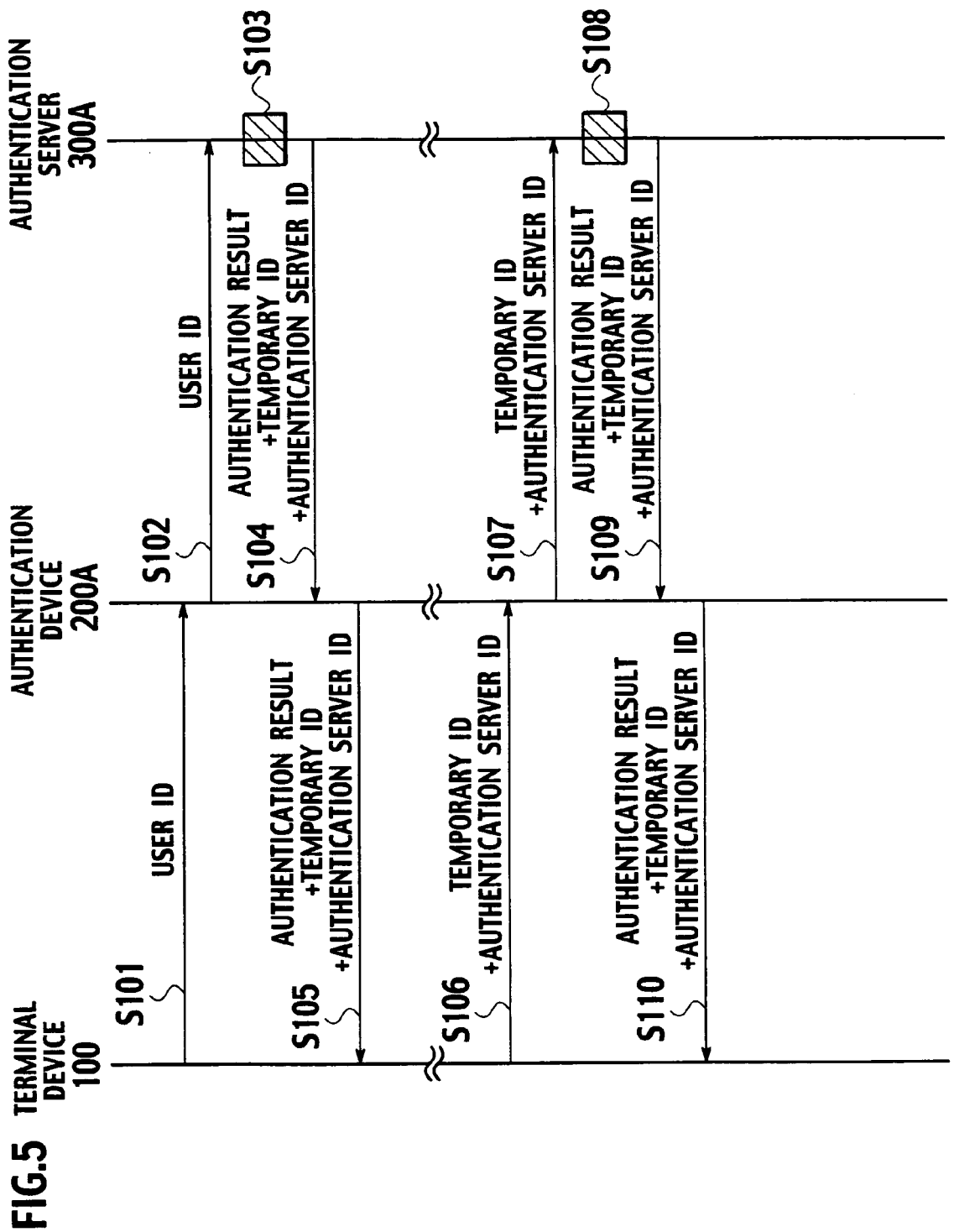
FIG. 5 is a sequence diagram showing user authentication processing in the authentication system according to the first embodiment of the present invention.

As shown in FIG. 5, in step S101, to request initial user authentication processing, the terminal device 100, which has not yet been assigned a temporary ID, transmits first authentication information including the user ID to the authentication device 200A.

In step S102, the authentication device 200A refers to the user ID table and the authentication server ID table 2, and forwards the first authentication information to the authentication server 300A which is associated with the user ID included in the received first authentication information.

In step S103, the authentication server 300A performs user authentication processing on the user of the terminal device 100, based on the received first authentication information. Then, the authentication server 300A randomly generates a temporary ID for the user of the terminal device 100.

In step S104, the authentication server 300A transmits the generated temporary ID and an authentication server ID for identifying the authentication server 300A, together with an authentication result showing success of the user authentication processing on the user of the terminal device 100, to the authentication device 200A.

In step S105, the authentication device 200A communicates the received authentication result, temporary ID and authentication server ID to the terminal device 100.

In step S106, to request subsequent user authentication processing, the terminal device 100 transmits second authentication information including the temporary ID and the authentication server ID to the authentication device 200A.

In step S107, the authentication device 200A refers to the authentication server ID table 2, and transmits third authentication information including the temporary ID and the authentication server ID to the authentication server 300A, based on the authentication server ID included in the received second authentication information.

In step S108, the authentication server 300A performs user authentication processing on the user of the terminal device 100, based on the received third authentication information. Then, the authentication server 300A randomly generates a new temporary ID for the user of the terminal device 100.

In step S109, the authentication server 300A transmits the generated temporary ID and the authentication server ID for identifying the authentication server 300A, together with an authentication result showing success of the user authentication processing on the user of the terminal device 100, to the authentication device 200A.

In step S110, the authentication device 200A communicates the received authentication result, temporary ID and authentication server ID to the terminal device 100.

According to the authentication system of this embodiment, even in a network where user authentication processing on users of terminal devices is performed by the multiple authentication servers 300A to 300C in view of load distribution or the like, user IDs can be concealed by a method using temporary IDs.

Authentication System in Second Embodiment of the Invention

An authentication system according to a second embodiment of the present invention will be described with reference to FIGS. 6 and 7, in which differences from the above-described authentication system according to the first embodiment will be noted.

Figure 6:
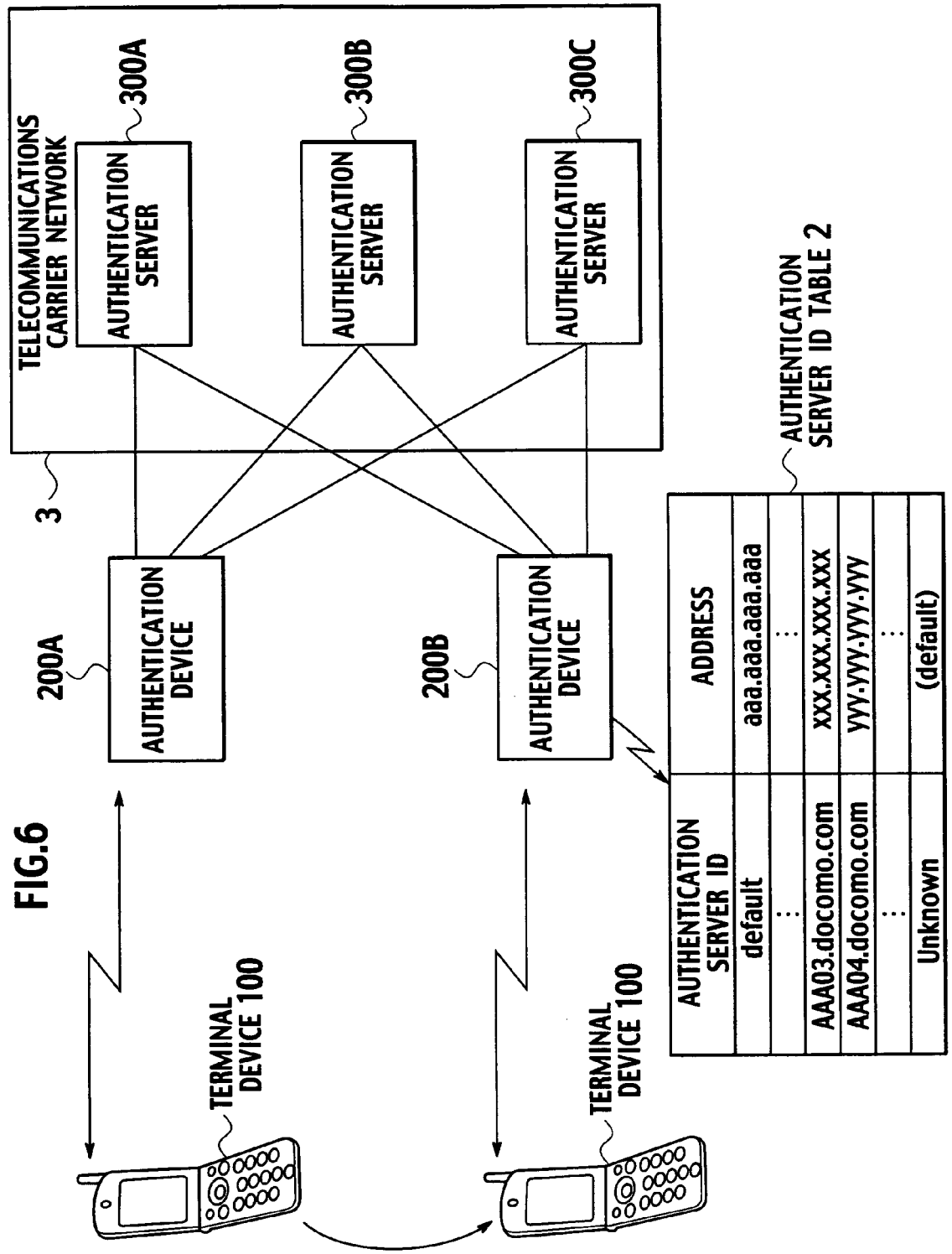
FIG. 6 is an overall block diagram of an authentication system according to a second embodiment of the present invention.

This embodiment will be described with an instance where a terminal device 100 shifts from communication with an authentication device 200A to communication with an authentication device 200B due to travel of the terminal device 100 as shown in FIG. 6.

In this embodiment, both of the authentication devices 200A and 200B are connected to all authentication servers 300A to 300C in a telecommunications carrier network 3.

Also, in this embodiment, the authentication devices 200A and 200B periodically exchange updates of authentication server ID tables 2 with each other.

Next, with reference to FIG. 7, user authentication processing in the authentication system according to this embodiment will be described.

Figure 7:
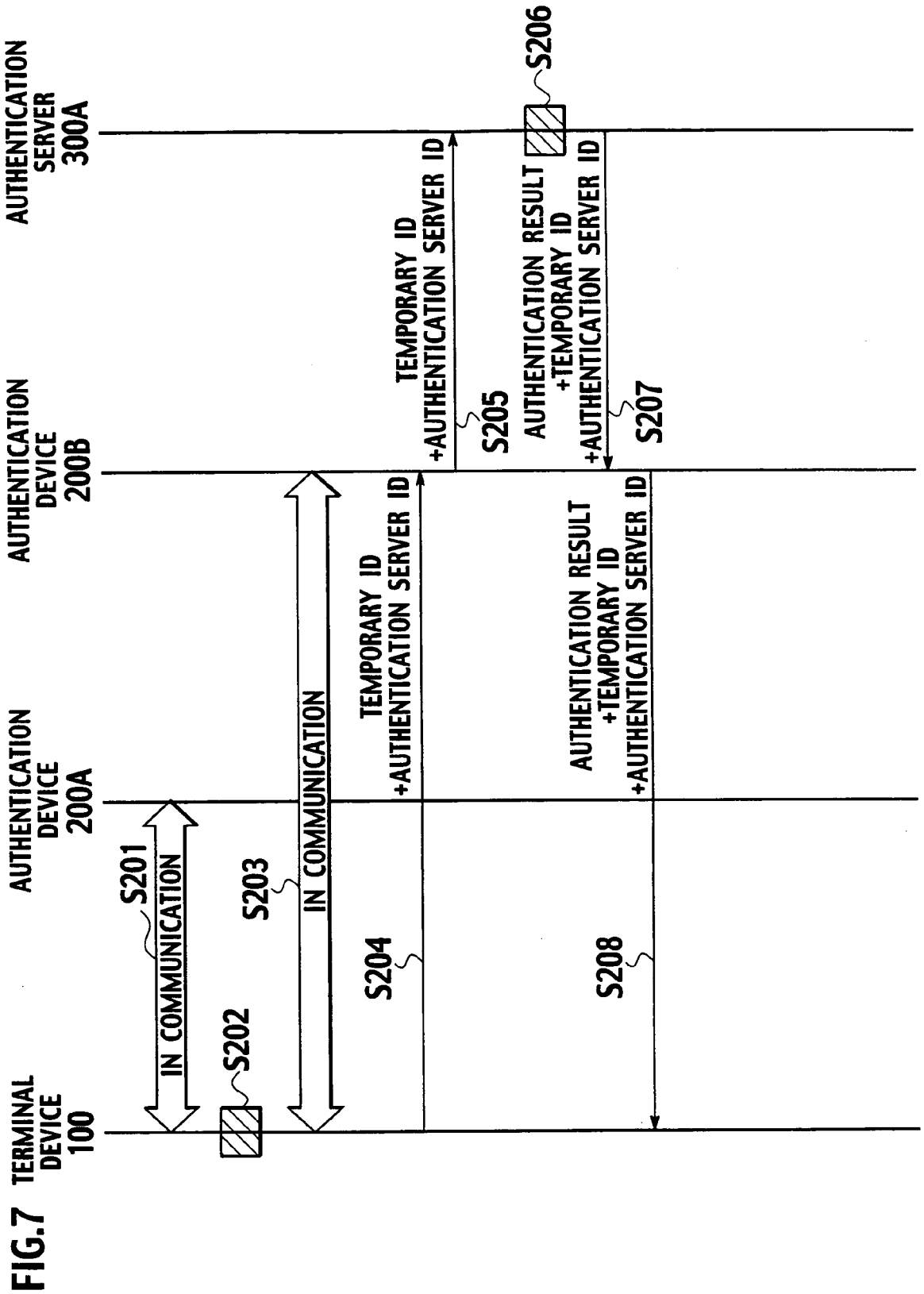
FIG. 7 is a sequence diagram showing user authentication processing in the authentication system according to the second embodiment of the present invention.

As shown in FIG. 7, the terminal device 100 in communication with the authentication device 200A in step S201 travels in step S202, and in step S203, establishes communication with the authentication device 200B.

The terminal device 100 has performed initial user authentication processing via the authentication device 200A, and a temporary ID for a user of the terminal device 100 has already been issued by the authentication server 300A.

In step S204, the terminal device 100 in communication with the authentication device 200B transmits second authentication information including the temporary ID and an authentication server ID to the authentication device 200B.

In step S205, the authentication device 200B refers to the authentication server ID table 2, and, based on the authentication server ID included in the received second authentication information, transmits third authentication information including the temporary ID and the authentication server ID to the authentication server 300A.

In step S206, based on the third authentication information received, the authentication server 300A performs user authentication processing on the user of the terminal device 100. Then, the authentication server 300A randomly generates a new temporary ID for the user of the terminal device 100.

In step S207, the authentication server 300A transmits the generated temporary ID and the authentication server ID for identifying the authentication server 300A, together with an authentication result showing success of the user authentication processing on the user of the terminal device 100, to the authentication device 200B.

In step S208, the authentication device 200B communicates the received authentication result, temporary ID and authentication server ID to the terminal device 100.

According to the authentication system of this embodiment, user authentication processing can be performed by communicating a temporary ID without communicating a user ID even when a new connection is established to the different authentication device 200B.

Authentication System in Third Embodiment of the Invention

An authentication system according to a third embodiment of the present invention will be described with reference to FIGS. 8 to 10, in which differences from the above-described authentication system according to the first embodiment will be noted.

Figure 8:
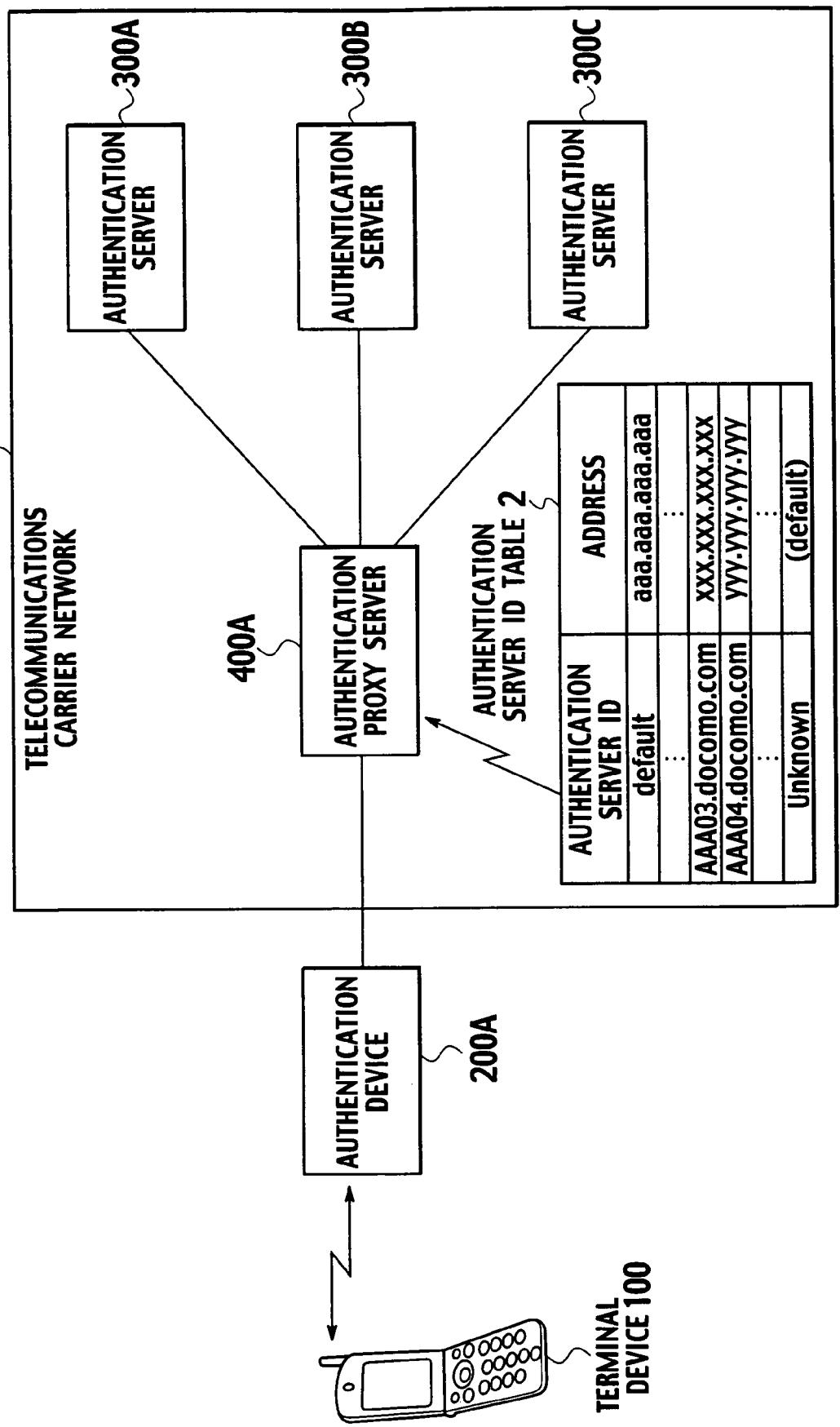
FIG. 8 is an overall block diagram of an authentication system according to a third embodiment of the present invention.

As shown in FIG. 8, in a telecommunications carrier network 3, an authentication proxy server 400A is provided in addition to a plurality of authentication servers 300A to 300C.

The authentication proxy server 400A is a proxy server which serves as a delegate of the authentication servers 300A to 300C to an authentication device 200A. The authentication proxy server 400A is connected to the authentication device 200A and the authentication servers 300A to 300C.

Figure 9:
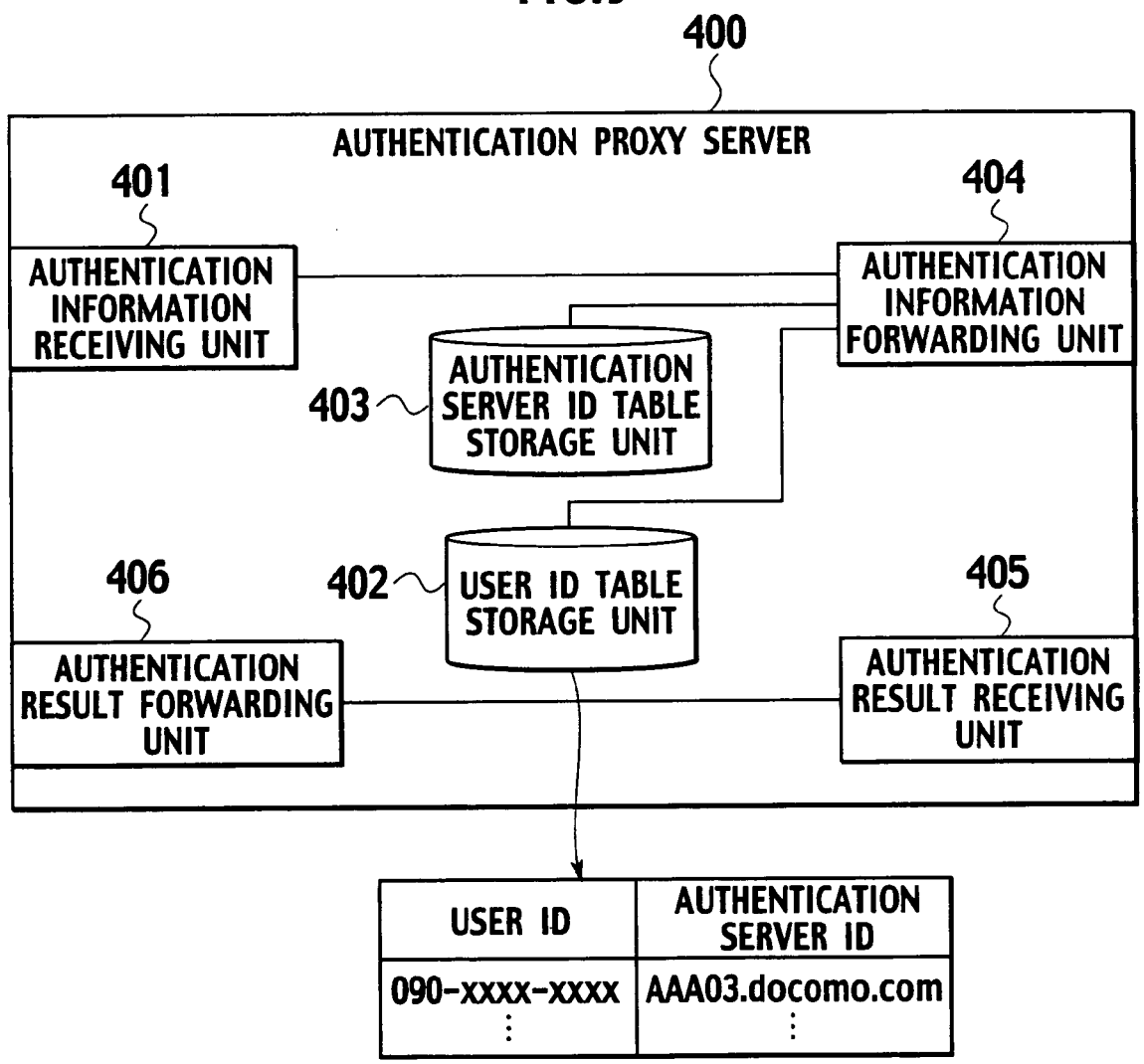
FIG. 9 is a functional block diagram of an authentication proxy server in the authentication system according to the third embodiment of the present invention.

Specifically, as shown in FIG. 9, the authentication proxy server 400A is provided with an authentication information receiving unit 401, a user ID table storage unit 402, an authentication server ID table storage unit 403, an authentication information forwarding unit 404, an authentication result receiving unit 405 and an authentication result forwarding unit 406. In this embodiment, the authentication proxy server 400A is configured to serve as a relay device for forwarding authentication information transmitted from a terminal device 100 to one of the authentication servers 300A to 300C.

The functions 401 to 406 of the authentication proxy server 400A are identical to the functions 201 to 206 of the authentication device 200A shown in FIG. 3.

Next, with reference to FIG. 10, user authentication processing in the authentication system according to this embodiment will be described.

Figure 10:
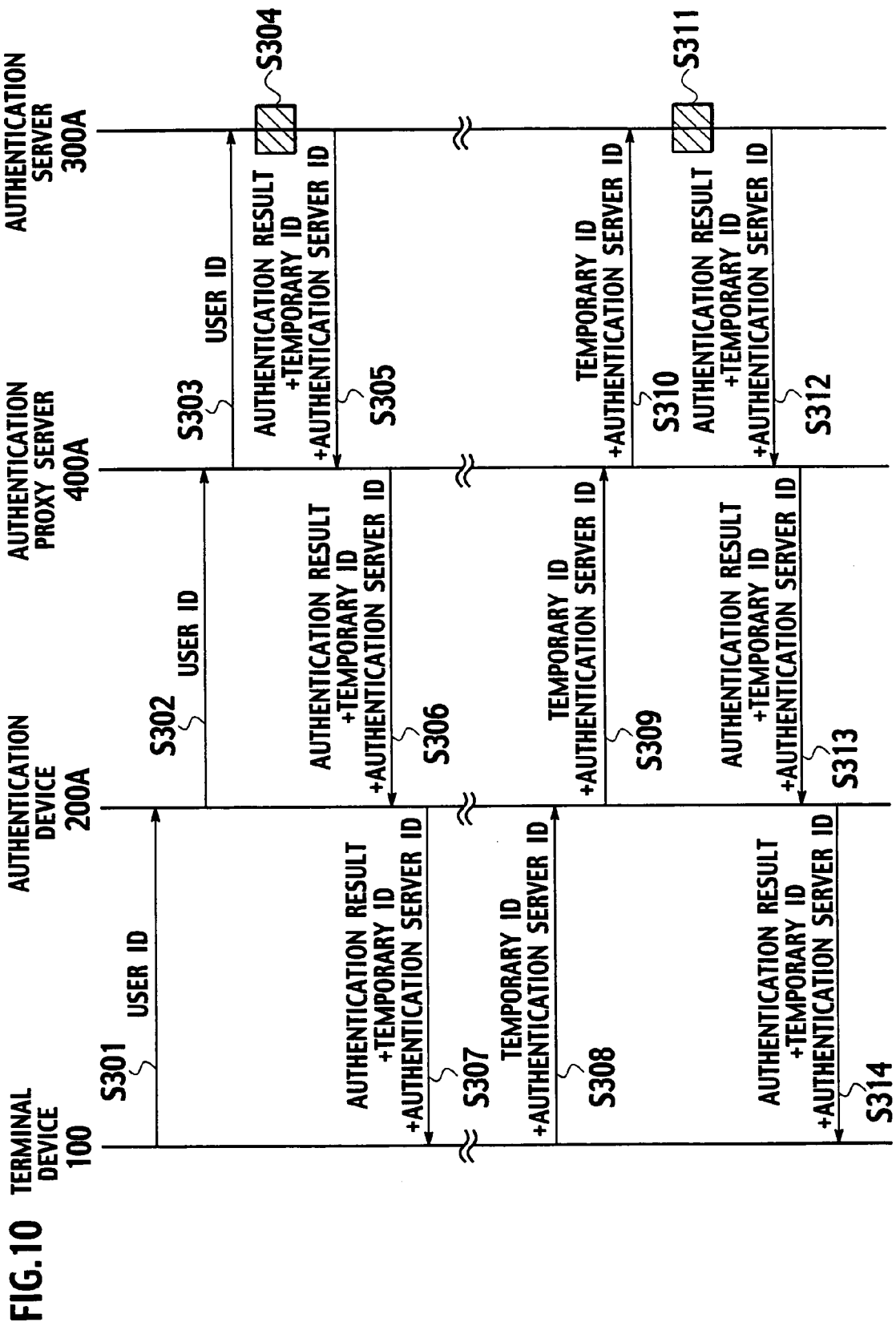
FIG. 10 is a sequence diagram showing user authentication processing in the authentication system according to the third embodiment of the present invention.

As shown in FIG. 10, in step S301, to request initial user authentication processing, the terminal device 100, which has not yet been assigned a temporary ID, transmits first authentication information including a user ID to the authentication device 200A.

In step S302, the authentication device 200A forwards the received first authentication information to the authentication proxy server 400A to which it is connected.

If the authentication device 200A is connected to a plurality of authentication proxy servers 400, it may be configured to forward the received first authentication information to an authentication proxy server 400 selected in a predetermined manner.

In step S303, the authentication proxy server 400A refers to a user ID table and an authentication server ID table 2, and forwards the received first authentication information to the authentication server 300A associated with the user ID included in the received first authentication information.

In step S304, based on the received first authentication information, the authentication server 300A performs user authentication processing on a user of the terminal device 100. Then, the authentication server 300A randomly generates a temporary ID for the user of the terminal device 100.

In step S305, the authentication server 300A transmits the generated temporary ID and an authentication server ID for identifying the authentication server 300A, together with an authentication result showing success of the user authentication processing on the user of the terminal device 100, to the authentication proxy server 400A.

In step S306, the authentication proxy server 400A communicates the received authentication result, temporary ID and authentication server ID to the authentication device 200A.

In step S307, the authentication device 200A communicates the received authentication result, temporary ID and authentication server ID to the terminal device 100.

In step S308, to request subsequent user authentication processing, the terminal device 100 transmits second authentication information including the temporary ID and the authentication server ID to the authentication device 200A.

In step S309, the authentication device 200A forwards the received second authentication information to the authentication proxy server 400A to which it is connected.

In step S310, the authentication proxy server 400A refers to the authentication server ID table 2, and based on the authentication server ID included in the received second authentication information, transmits third authentication information including the temporary ID to the authentication server 300A.

In step S311, based on the third authentication information received, the authentication server 300A performs user authentication processing on the user of the terminal device 100. Then, the authentication server 300A randomly generates a new temporary ID for the user of the terminal device 100.

In step S312, the authentication server 300A transmits the generated temporary ID and the authentication server ID for identifying the authentication server 300A, together with an authentication result showing success of the user authentication processing on the user of the terminal device 100, to the authentication proxy server 400A.

In step S313, the authentication proxy server 400A communicates the received authentication result, temporary ID and authentication server ID to the authentication device 200A.

In step S314, the authentication device 200A communicates the received authentication result, temporary ID and authentication server ID to the terminal device 100.

Authentication System in Fourth Embodiment of the Invention

An authentication system according to a fourth embodiment of the present invention will be described with reference to FIGS. 11 and 12, in which differences from the above-described authentication system according to the third embodiment will be noted.

Figure 11:
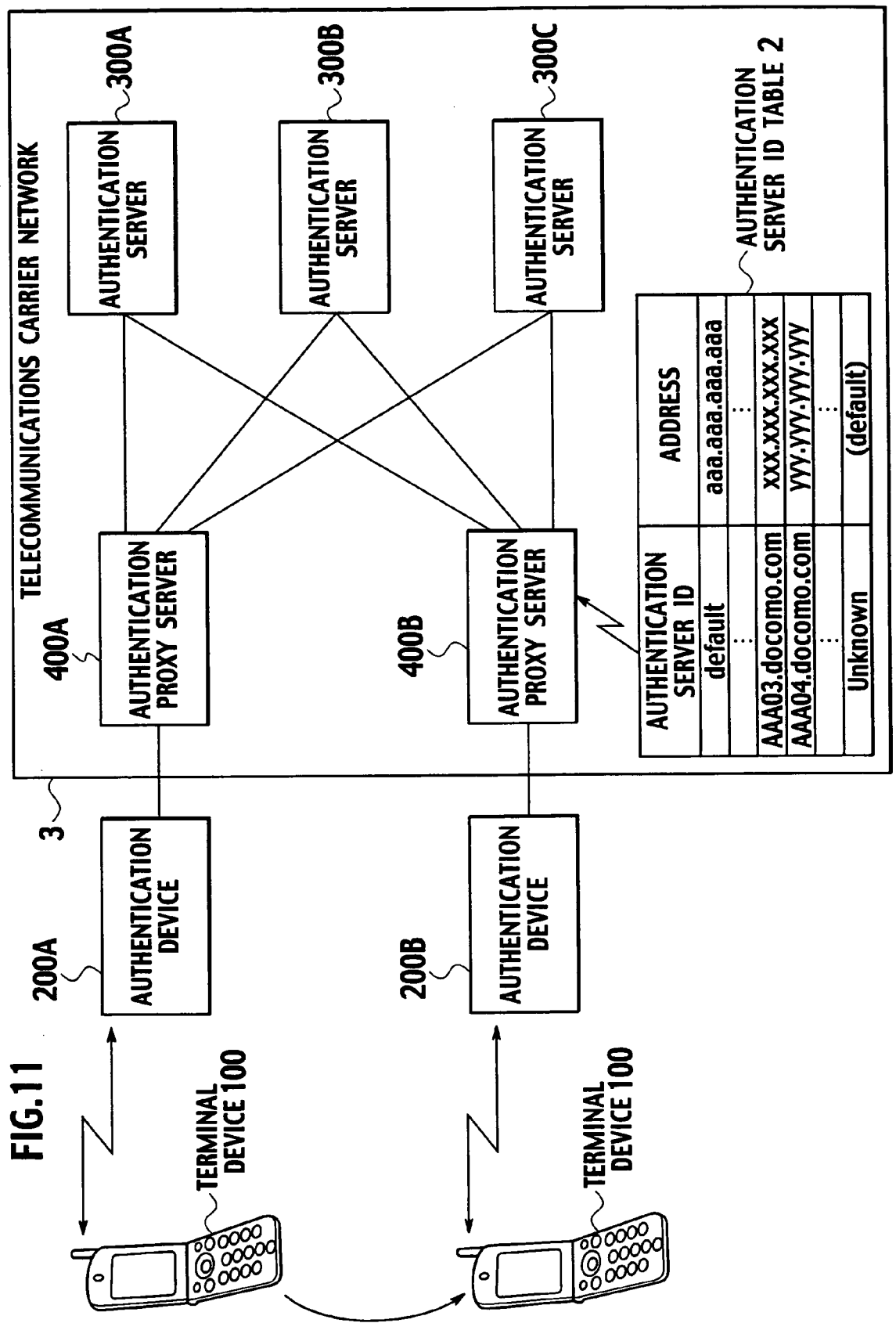
FIG. 11 is an overall block diagram of an authentication system according to a fourth embodiment of the present invention.

This embodiment will be described with an instance where a terminal device 100 shifts from communication with an authentication device 200A to communication with an authentication device 200B due to travel of the terminal device 100 as shown in FIG. 11.

In this embodiment, in a telecommunications carrier network 3, an authentication proxy server 400B connected to the authentication device 200B is provided in addition to an authentication proxy server 400A connected to the authentication device 200A.

Both of the authentication proxy servers 400A and 400B are connected to all authentication servers 300A to 300C in the telecommunications carrier network 3.

Also, in this embodiment, the authentication proxy servers 400A and 400B periodically exchange updates of authentication server ID tables 2 with each other.

Next, with reference to FIG. 12, user authentication processing in the authentication system according to this embodiment will be described.

As shown in FIG. 12, the terminal device 100 in communication with the authentication device 200A in step S401 travels in step S402, and in step S403, establishes communication with the authentication device 200B.

The terminal device 100 has performed initial user authentication processing via the authentication device 200A, and a temporary ID for a user of the terminal device 100 has already been issued by the authentication server 300A.

In step S404, the terminal device 100 in communication with the authentication device 200B transmits second authentication information including the temporary ID and an authentication server ID to the authentication device 200B.

In step S405, the authentication device 200B forwards the received second authentication information to the authentication proxy server 400B to which it is connected.

If the authentication device 200B is connected to a plurality of authentication proxy servers 400, it may be configured to forward the received second authentication information to an authentication proxy server 400 selected in a predetermined manner.

In step S406, the authentication proxy server 400B refers to the authentication server ID table 2, and based on the authentication server ID included in the received second authentication information, transmits third authentication information including the temporary ID and the authentication server ID to the authentication server 300A.

In step S407, the authentication server 300A performs user authentication processing on the user of the terminal device 100, based on the received third authentication information. Then, the authentication server 300A randomly generates a new temporary ID for the user of the terminal device 100.

In step S408, the authentication server 300A transmits the generated temporary ID and the authentication server ID for identifying the authentication server 300A, together with an authentication result showing success of the user authentication processing on the user of the terminal device 100, to the authentication proxy server 400B.

In step S409, the authentication proxy server 400B communicates the received authentication result, temporary ID and authentication server ID to the authentication device 200B.

In step S410, the authentication device 200B communicates the received authentication result, temporary ID and authentication server ID to the terminal device 100.

Authentication System in Fifth Embodiment of the Invention

With reference to FIGS. 13 and 14, an authentication system according to a fifth embodiment of the present invention will be described, in which differences from the above-described authentication system according to the fourth embodiment will be noted.

As shown in FIG. 13, this embodiment will be described with an instance where a terminal device 100 shifts from communication with an authentication device 200A to communication with an authentication device 200C due to travel of the terminal device 100. The authentication system of this embodiment is implemented by a plurality of telecommunications carriers A and B.

More specifically, a network 3A of the telecommunications carrier A includes a plurality of authentication servers 300A to 300C and an authentication proxy server 400A. A network 3B of the telecommunications carrier B includes a plurality of authentication servers 300D and an authentication proxy server 400C.

The network 3A of the telecommunications carrier A and the network 3B of the telecommunications carrier B are connected via gateways thereof, and can provide roaming services to each other.

In this embodiment, the authentication proxy servers 400A and 400C periodically exchange updates of authentication server ID tables 2 with each other.

Next, with reference to FIG. 14, user authentication processing in the authentication system according to this embodiment will be described.

As shown in FIG. 14, the terminal device 100 in step S501 in communication with the authentication device 200A connected to the authentication proxy server 400A in the network 3A of the telecommunications carrier A travels in step S502, and in step S503, establishes communication with the authentication device 200C connected to the authentication proxy server 400C in the network 3B of the telecommunications carrier B.

The terminal device 100 has performed initial user authentication processing via the authentication device 200A, and a temporary ID for a user of the terminal device 100 has already been issued by the authentication server 300A.

In step S504, the terminal device 100 in communication with the authentication device 200C transmits second authentication information including the temporary ID and an authentication server ID to the authentication device 200C.

In step S505, the authentication device 200C forwards the received second authentication information to the authentication proxy server 400C to which it is connected.

If the authentication device 200C is connected to a plurality of authentication proxy servers 400 in the network 3B of the telecommunications carrier B, it may be configured to forward the received second authentication information to an authentication proxy server 400 selected in a predetermined manner.

In step S506, the authentication proxy server 400C refers to the authentication server ID table 2, and based on the authentication server ID included in the received second authentication information, transmits third authentication information including the temporary ID and the authentication server ID to the authentication server 300A.

More specifically, the authentication proxy server 400C is configured to forward the third authentication information addressed to the authentication server 300A to the gateway in the network 3A of the telecommunications carrier A, that is, to forward the third authentication information to the authentication server 300A using the roaming service.

In step S507, based on the third authentication information received, the authentication server 300A performs user authentication processing on the user of the terminal device 100. Then, the authentication server 300A randomly generates a new temporary ID for the user of the terminal device 100.

In step S508, the authentication server 300A transmits the generated temporary ID and the authentication server ID for identifying the authentication server 300A, together with an authentication result showing success of the user authentication processing on the user of the terminal device 100, to the authentication proxy server 400C.

More specifically, the authentication server 300A is configured to forward the information (authentication result, temporary ID and authentication server ID) addressed to the authentication proxy server 400C to the gateway in the network 3B of the telecommunications carrier B, that is, to forward the information (authentication result, temporary ID and authentication server ID) to the authentication proxy server 400C using the roaming service.

In step S509, the authentication proxy server 400C communicates the received authentication result, temporary ID and authentication server ID to the authentication device 200C.

In step S510, the authentication device 200C communicates the received authentication result, temporary ID and authentication server ID to the terminal device 100.

As described above, the present invention can provide an authentication method which can implement safe user authentication processing, eliminating the need for a terminal device to obtain and selectively use a plurality of temporary IDs in a network where user authentication processing is performed by a plurality of authentication servers, and a terminal device, a relay device and an authentication server for use in the method.

According to the present invention, in a network where user authentication processing is performed in a distributed manner, such as a network where a plurality of authentication servers are provided in view of load distribution, or a network constructed across a plurality of telecommunications carriers, user authentication processing can be safely performed without revealing a user ID, and invasion of users' location privacy can be prevented.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. An authentication method for performing user authentication processing on a user of a terminal device, the method comprising:
   transmitting, at the terminal device, first authentication information including a user ID to a relay device;
   forwarding, at the relay device, the first authentication information to an authentication server associated with the user ID;
   performing, at the authentication server, user authentication processing on the user of the terminal device, based on the first authentication information;
   issuing, at the authentication server, a temporary ID for the user of the terminal device and transmitting an authentication server ID for identifying the authentication server and the temporary ID to the relay device;
   communicating, at the relay device, the temporary ID and the authentication server ID to the terminal device;
   transmitting, at the terminal device, second authentication information including the temporary ID and the authentication server ID to the relay device;
   transmitting, at the relay device, third authentication information including the temporary ID to the authentication server, based on the authentication server ID included in the second authentication information; and
   performing, at the authentication server, user authentication processing on the user of the terminal device, based on the third authentication information.

2. A terminal device configured to be used by a user on whom user authentication processing is performed by an authentication server, the terminal comprising:
   a first authentication information transmitter configured to transmit first authentication information including a user ID to an authentication server via a relay device;
   a first authentication information receiver configured to receive, from the authentication server via the relay device, an authentication server ID corresponding to the authentication server and a temporary ID assigned by the authentication server based on a first authentication process performed on the first authentication information including the user ID;
   a temporary ID storage configured to store the temporary ID assigned by the authentication server receiving the first authentication information via the relay device; and
   a second authentication information transmitter configured to transmit second authentication information including the temporary ID and an authentication server ID for identifying the authentication server to the authentication server via the relay device.

3. The terminal device of claim 2, further comprising:
   a second authentication information receiver configured to receive, from the authentication server via the relay device, the temporary ID, the authentication server ID and a result of a second authentication process performed at the authentication server based on the second authentication information including the temporary ID.

4. A relay device configured to forward authentication information transmitted from a terminal device to an authentication server, the relay device comprising:
   a first authentication information transmitter configured to forward first authentication information including a user ID received from the terminal device to the authentication server;
   a first authentication information receiver configured to receive, from the authentication server, an authentication server ID corresponding to the authentication server and a temporary ID assigned by the authentication server based on a first authentication process performed on the first authentication information including the user ID;
   a second authentication information transmitter configured to forward the authentication server ID and the temporary ID to the terminal device; and
   a third authentication information transmitter configured to transmit, when second authentication information including the temporary ID and the authentication server ID is received from the terminal device, third authentication information including the temporary ID to the authentication server identified by the authentication server ID.

5. The relay device of claim 4, further comprising:
   a second authentication information receiver configured to receive, from the authentication server, the temporary ID, the authentication server ID and a result of a second authentication process performed at the authentication server based on the third authentication information including the temporary ID.

6. The relay device of claim 5, further comprising:
   a fourth authentication information transmitter configured to transmit, to the terminal device, the temporary ID, the authentication server ID and the result of the second authentication process performed at the authentication server based on the third authentication information including the temporary ID.

7. An authentication server configured to perform user authentication processing on a user of a terminal device, the authentication server comprising:
   a first authentication information processor configured to perform user authentication processing on the user of the terminal device, based on first authentication information including a user ID received from the terminal device;
   a temporary ID generator configured to generate a temporary ID for the user of the terminal device to communicate to the terminal device;
   an authentication information transmitter configured to transmit, to the terminal device via a relay device, an authentication server ID corresponding to the authentication server and the temporary ID; and
   a third authentication information processor configured to perform user authentication processing on the user of the terminal device, based on third authentication information received, the third authentication information including the temporary ID transmitted from the terminal device.

* * * * *